(12) United States Patent  (10) Patent No.: US 7,315,105 B2
Hartmann  (45) Date of Patent: Jan. 1, 2008

(54) DEVICE FOR AN ELECTRICAL MACHINE

(75) Inventor: Christian Hartmann, Trondheim (NO)

(73) Assignee: Smart Motor AS, Trondheim (NO)

( * ) Notice: Subject to any disclaimer, the term of this patent is extended or adjusted under 35 U.S.C. 154(b) by 104 days.

(21) Appl. No.: 10/556,408

(22) PCT Filed: May 6, 2004

(86) PCT No.: PCT/NO2004/000132

§ 371 (c)(1),
(2), (4) Date: Nov. 10, 2005

(87) PCT Pub. No.: WO2004/102773

PCT Pub. Date: Nov. 25, 2004

(65) Prior Publication Data

US 2007/0001539 A1  Jan. 4, 2007

(30) Foreign Application Priority Data

May 14, 2003 (NO) ................................. 20032171

(51) Int. Cl.
H02K 21/24 (2006.01)
(52) U.S. Cl. ................. 310/254; 310/156.32; 310/216; 310/218

(58) Field of Classification Search ..............................
310/156.32–156.37, 216, 218, 254; 319/259
See application file for complete search history.

(56) References Cited

U.S. PATENT DOCUMENTS 5,977,684 A * 11/1999 Lin ............................ 310/268
6,664,692 B1 12/2003 Kristoffersen

FOREIGN PATENT DOCUMENTS

| EP | 1130748 A1 | * | 9/2001 |
| GB | 2255452 A | * | 11/1992 |
| WO | 96/21965 | | 7/1996 |
| WO | 9621965 A1 | * | 7/1996 |
| WO | 30238 A1 | * | 5/2000 |

* cited by examiner

Primary Examiner—Burton Mullins
(74) Attorney, Agent, or Firm—Dennison, Schultz & Macdonald

(57) ABSTRACT

A device for axially magnetized electrical machines, especially motors, having a rotor with permanent magnets and a stator with a series of windings on iron cores. The stator comprises a support pin (17), which is integrated or joined with a protruding flange (20), which works as a support for cores (21, 22) with and without windings, which forms teeth. There are at least between some of the cores (21, 22) arranged support elements (25), which are fixed to the hub (18) of the stator.

4 Claims, 2 Drawing Sheets

DEVICE FOR AN ELECTRICAL MACHINE

This application is a filing under 35 USC 371 of PCT/NO2004/000132, filed May 6, 2004.

The present invention relates to a device for a stator for an electrical machine, particularly a motor. The rotor in a machine like this, may be a cylindrical house with permanent magnets arranged in series circumferentially round both of the sidewalls.

Such machines are characterized in having high torque compared to electrical machines, and are thus especially suitable for applications where compact, gearless solutions are desired. An example of such an application is an electrical motor, integrated in a wheel chair.

The invention may be used correspondingly for generators.

The electrical machines in question, are axially magnetized, due to the arrangement of the magnets of the rotor and the direction of the magnetic field. Particular for this machine, is that it also has two separate operating air gaps, i.e. air gaps between rotor and stator, where the electromagnetic forces are generated. The poles of the stator are manufactured of fan-shaped pieces of pressed iron powder. The pieces are positioned alternating wound with copper wire between non-wound pieces. Due to the proportions, with relatively short face to face dimension in relation to the diameter, together with the magnetic forces working between the poles of the stator and the permanent magnetized poles of the rotor, the construction is exposed of great mechanical strains. Particularly the stator is vulnerable for these strains.

Despite of the operating parts of the stator are molded in epoxy or some similar plastic material, the air gap between the poles of the rotor and the surfaces of the pieces of iron powder in the stator, has to be so narrow that there is no space for giving the stator a solid superstructure of casting material. The consequence of this, is that such machines are exposed to breakdown, due to the pieces of the poles are breaking-out.

SUMMARY OF THE INVENTION

The main object of the invention is therefore to eliminate the aforementioned disadvantage of electrical machines of prior art, by providing a device for supporting the poles of the stator. An object is to provide a device that do not need substantially more space than prior art machines. This is achieved by that the device constitutes a part of the magnetic circuit and that it may be combined with embedding of the stator in epoxy or similar.

The device must be of soft iron to have sufficient magnetic conductance at the same time as efforts must be taken to avoid unacceptable eddy currents.

The invention is characterized by a design which provides a satisfactory result and is is stable. The solution can be realized by simple means and in a simple way, The invention will be described in more details with reference to an example.

BRIEF DESCRIPTION OF THE DRAWINGS

The present invention, will in the following, be described in more detail with reference to the drawings, wherein.

DESCRIPTION OF THE PREFERRED EMBODIMENTS

Figure 1:
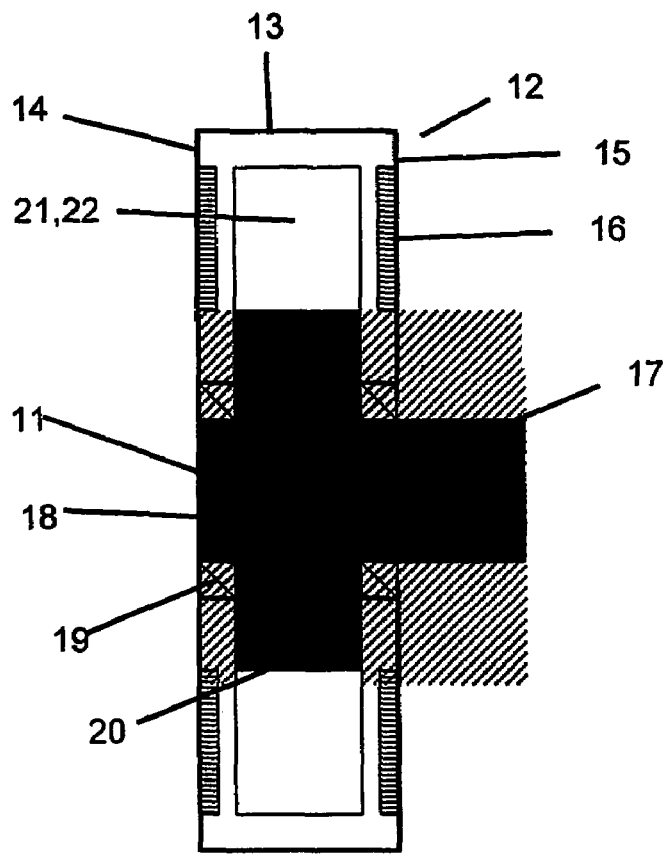
FIG. 1 is a schematic axially radial cross-section through an embodiment of the invention.

FIG. 1, shows an electrical machine, having a stator 11 and a rotor 12. The rotor 12 comprises a cylindrical house 13 with end walls 14, 15, which are carrying annular arranged permanent magnets 16. An air gap separates each ring of magnets from the iron of the stator 21, 22. The house 13 of the rotor may be fixed in a suitable way to a not shown rotating part or a pulley or some other powder element.

The stator 11 is provided with a shaft or a carry pin 17 and a hub 18, in one piece. The hub 18 has a protruding flange 20, centrally positioned in the rotor house. The protruding flange 20 acts as a mold for epoxy, at the same time as it carries a series of cores 21, which are wound with copper wire, and cores 22 without copper wire, which teeth of the stator 11. The remaining teeth comprise of laminated cores and are fixed to the hub 18, in recesses 24 in the protruding flange 20.

Figure 2:
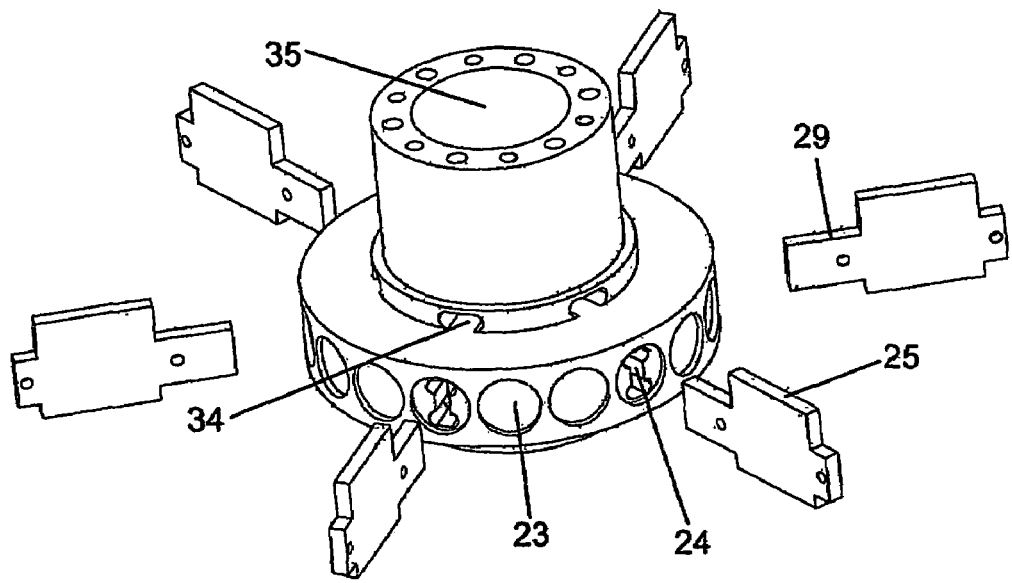
FIG. 2 is an exploded perspective view of the hub of the stator in FIG. 1, with support devices, making the shape of the groove becomes visible.
Figure 3:
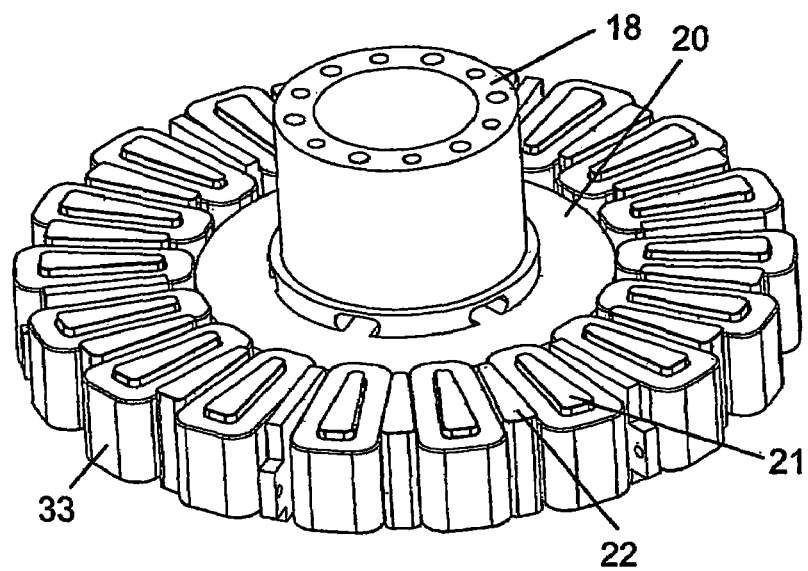
FIG. 3 is corresponding perspective view of the hub of the stator in FIG. 1, where all the pieces of iron powder of the stator are arranged, ready for embedding, and it also shows that every second piece of iron powder is clad by a winding.

FIGS. 2 and 3, shows details of the stator 11 in two different phases of manufacturing, namely at providing the hub 18 for insertion of support elements 25 (FIG. 2), and after fixing of cores and windings, before embedding (FIG. 3).

The protruding flange is provided with recesses 23, which are to provide better adhesion between the hub and the casting material. The number of such recesses and the shape of these are not vital. In addition to these recesses, there are six rectangular grooves 24 on the protruding flange. These grooves are designed for insertion of laminated cores 25. The grooves 24, both supports and positions the cores, and thus the design and the dimension of these grooves 24 are of vital importance.

Figure 4:
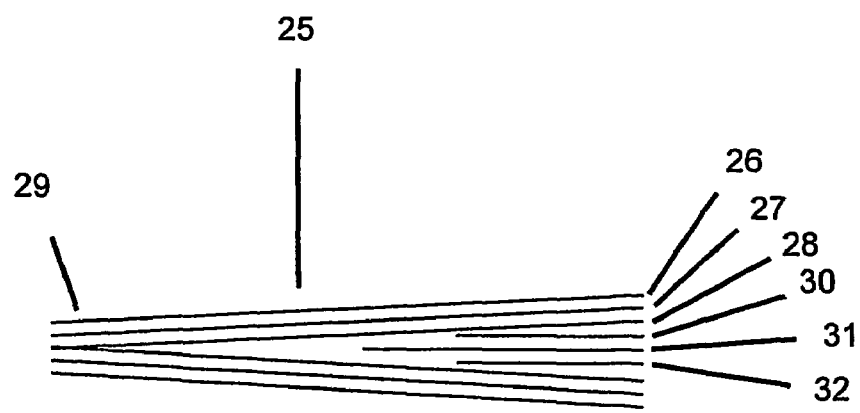
FIG. 4 is an end view of a support element, seen in an axial direction.

The cores 25 are shown more detailed in FIG. 4. The cores 25 are assembled of three outer sheets 26-28 on each side, which have an inner tongue 29, designed to be inserted in a rectangular groove 24, and a central part of three shorter sheets 30-32. In this way, the cores 25 will, seen in axial direction, be fan-shaped. Since the cores 25 substitutes each third non-wound iron powder elements 22, and thus is integrated in the magnetic circuit of the stator, it is important that the cores have this fan-shape, in such a way that they, in magnetic matter, are as similar as possible to the iron powder elements they substitutes.

Due to the cores. 25 are having a tongue 29, which are pressed into the rectangular grooves 24, a substantial mechanical stiffening of the stator construction is achieved, and the risk of breakdown is reduced.

After assembling the above parts, then the ends of the copper wire in the winding cores 33, are brought into the centre 35 of the hub 18, through hole 34, to be connected. The stator is then placed in a mold and embedded in epoxy.

The invention claimed is:

1. A device for axially magnetized electrical machines, particularly motors, having a rotor with permanent magnets and a stator with a series of winding on iron cores, and where the stator comprises a support pin (17), which is integrated or joined with a protruding flange (20), which works as a support for cores (21,22), with and without windings, which forms teeth, characterized in that at least between some of the cores (21,22), support elements (25) are arranged, which are fixed to the hub (18) of the stator, said support elements having a tongue (29), which is inserted in radial recesses (24) in the hub of the stator.

2. A device according to claim 1, characterized in that the support elements (25) are laminated iron cores.

3. A device according to claim 2, characterized in that the laminated elements are arranged in a fan-shape.

4. A device according to claim 1, characterized in that support elements are arranged between every third iron core (21) round the circumference.

* * * * *